United States Patent
Shih et al.

(10) Patent No.: US 10,882,767 B2
(45) Date of Patent: Jan. 5, 2021

(54) METHOD FOR REMOVING AMMONIA NITROGEN IN AQUEOUS SOLUTION

(71) Applicant: National Sun Yat-Sen University, Kaohsiung (TW)

(72) Inventors: Yu-Jen Shih, Kaohsiung (TW); Chin-Pao Huang, Kaohsiung (TW); Yao-Hui Huang, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 16/223,434

(22) Filed: Dec. 18, 2018

(65) Prior Publication Data

US 2020/0189940 A1 Jun. 18, 2020

(51) Int. Cl.
*C02F 1/46* (2006.01)
*C02F 1/467* (2006.01)
*C02F 1/461* (2006.01)
*C02F 101/16* (2006.01)

(52) U.S. Cl.
CPC ........ *C02F 1/4672* (2013.01); *C02F 1/46109* (2013.01); *C02F 2001/46138* (2013.01); *C02F 2001/46171* (2013.01); *C02F 2101/16* (2013.01)

(58) Field of Classification Search
CPC ................ C02F 1/4672; C02F 1/46109; C02F 2001/46138; C02F 2001/46171; C02F 2101/16
See application file for complete search history.

(56) References Cited

U.S. PATENT DOCUMENTS

| | | | | |
|---|---|---|---|---|
| 6,315,886 B1 * | 11/2001 | Zappi | .................. | C02F 1/46104 204/228.3 |
| 2015/0122741 A1 * | 5/2015 | Eckelberry | ............ | C12N 13/00 210/704 |

FOREIGN PATENT DOCUMENTS

| | | |
|---|---|---|
| CN | 101746871 A | 6/2010 |
| CN | 102107977 A | 6/2011 |
| CN | 108726640 A | 11/2018 |
| TW | M528992 U | 9/2016 |

\* cited by examiner

*Primary Examiner* — Arun S Phasge
(74) *Attorney, Agent, or Firm* — Fay Sharpe LLP

(57) ABSTRACT

A method for removing ammonia nitrogen in an aqueous solution is provided in the present invention. The method includes performing an electrolysis reaction using an electrolysis device, such that the ammonia nitrogen is converted into nitrogen gas, nitrate or nitrite. The electrolysis device includes an anode including metal nickel, nickel hydroxide or nickel oxyhydroxide, and a cathode including metal copper. The method has high selectivity of converting the ammonia nitrogen into the nitrogen gas.

5 Claims, 20 Drawing Sheets

METHOD FOR REMOVING AMMONIA NITROGEN IN AQUEOUS SOLUTION

BACKGROUND

Field of Invention

The present invention relates to a method of removing ammonia nitrogen in an aqueous solution. More particularly, the present invention relates to a method of converting the ammonia nitrogen into nitrogen gas by reducing a concentration of nitrate.

Description of Related Art

Water released from a high technological manufacturing industry, aquaculture, a farming industry or agriculture, or the household water is likely to contain ammonia nitrogen, which is the main reason for eutrophication of water bodies. Nowadays, the ammonia nitrogen in wastewater is mostly degraded by a biological technique. In the biological technique, nitrification is performed in an aerobic environment by a microbial action to produce nitrite salts, and the microbial action (e.g., using anaerobic ammonium oxidation) is further performed in an anaerobic environment to undergo a redox reaction with ammonia gas, thereby producing and releasing nitrogen gas. Although the biological techniques has been well-developed, equipment used in the biological technique require a large space, conditions for domesticating microorganisms and treatment time are limited, and sludge may be formed as a byproduct of the biological technique.

The other common method for removing the ammonia nitrogen in the water is to add chloride in the water, in which an excess amount of hypochlorite may be used as an oxidant to convert the ammonia nitrogen in the water into the nitrogen gas. The addition of the chloride is usually performed in combination with an electrolysis device, in which an anode oxidizes the chloride in the water to form active chlorine such as chlorine gas or the hypochlorite, thereby indirectly and electrochemically oxidizing the ammonia nitrogen in the water. However, using the active chlorine as the oxidant may result in excess amount of the chloride remaining in the water, and the chloride is likely to react with organic substances to form a chloride-containing byproduct. In addition, the chloride in the water is also likely to cause damages to the electrodes of the electrolysis device, leading to reduced lifetime of the electrolysis device.

Furthermore, removing the ammonia nitrogen by oxidizing the ammonia nitrogen may form the nitrite and nitrate in addition to the nitrogen gas. In other words, the typical method is lack of selectivity of converting the ammonia nitrogen into the nitrogen gas. Even if the salts (the nitrite and the nitrate) slightly affect water quality, excessive salts still lead to a negative effect on the water.

Therefore, a method of removing ammonia nitrogen in an aqueous solution is required, in which a space required for performing the method is small, a high oxidation rate of the ammonia nitrogen and a high selectivity of converting the ammonia nitrogen into the nitrogen gas are realized.

SUMMARY

An aspect of the present invention provides a method of removing ammonia nitrogen in an aqueous solution. In some embodiments, the method includes providing an electrolysis device. The electrolysis device includes at least one anode, at least one cathode, an electrolytic solution and a tank. The at least one anode includes metal nickel, nickel hydroxide $(Ni(OH)_2)$ or nickel oxyhydroxide (NiOOH). The at least one cathode includes metal copper. The electrolytic solution includes ammonia nitrogen, in which pH of the electrolytic solution is at least 9. The at least one anode, the at least one cathode and the electrolytic solution are accommodated in the tank. Next, an electrolytic reaction is performed, such that the ammonia nitrogen is converted into nitrogen gas, nitrate or nitrite.

In some embodiments, the electrolytic solution includes a non-chloride electrolyte.

In some embodiments, a concentration of the ammonia nitrogen in the electrolytic solution is 20 ppm to 500 ppm before the electrolytic reaction is performed.

In some embodiments, a concentration of the non-chloride electrolyte is 0.01 M to 0.5 M.

In some embodiments, the at least one anode and the at least one cathode are respectively a hollow cylindrical electrode, and the at least one anode and the at least one cathode are concentrically disposed.

In some embodiments, the electrolysis device includes plural anodes and plural cathodes, each of the anodes and the cathodes is a hollow cylindrical electrode, and the anodes and the cathodes are concentrically and alternately disposed.

In some embodiments, the pH is 9 to 12.

In some embodiments, the electrolytic reaction is performed under a current density of 0.08 $mA/cm^2$ to 2.5 $mA/cm^2$.

In some embodiments, the electrolytic reaction further includes forming the nickel oxyhydroxide on a surface of the metal nickel or a surface of the nickel hydroxide.

In some embodiments, the metal copper is copper particles.

BRIEF DESCRIPTION OF THE DRAWINGS

The invention can be more fully understood by reading the following detailed description of the embodiment, with reference made to the accompanying drawings as follows.

DETAILED DESCRIPTION

The present invention aims at providing a method of removing ammonia nitrogen in an aqueous solution. The ammonia nitrogen may be removed by using an anode and a cathode composed of certain materials to perform an oxidizing reaction and a reducing reaction in an electrolysis device, so that the ammonia nitrogen may be converted into nitrogen gas, nitrate and nitrite. A high oxidation rate (or removal rate) of the ammonia nitrogen can be realized by the electrolysis device described later. Particularly, high selectivity of converting the ammonia nitrogen into the nitrogen gas is realized by the method and the electrolysis device. In other words, a high conversion rate of converting the ammonia nitrogen into the nitrogen gas is achieved, and thus the nitrate remaining in the aqueous solution (e.g., water) can be reduced.

The term of "the oxidation rate of the ammonia nitrogen" may represent a concentration difference as a percentage of an initial concentration ($C_0$) of the ammonia nitrogen ($C/C_0 \times 100\%$), in which the concentration difference is between the initial concentration ($C_0$) and a concentration (C) of the ammonia nitrogen in the aqueous solution after the electrolytic reaction is performed. Because both conversion of the nitrogen gas and conversion of the nitrate from the ammonia nitrogen are the oxidizing reactions, and thus the term of "the oxidation rate" is used. Besides, the oxidation rate may be also referred to as the removal rate of the ammonia nitrogen.

The term of "the conversion rate" may represent an amount of certain substances (the nitrogen gas, the nitrate or the nitrite) converted from the oxidized ammonia nitrogen as a percentage of an amount of the oxidized ammonia nitrogen. The conversion rate may be also referred to as the selectivity of converting the ammonia nitrogen into the substances. A calculation of the conversion rate is described later.

Figure 1:
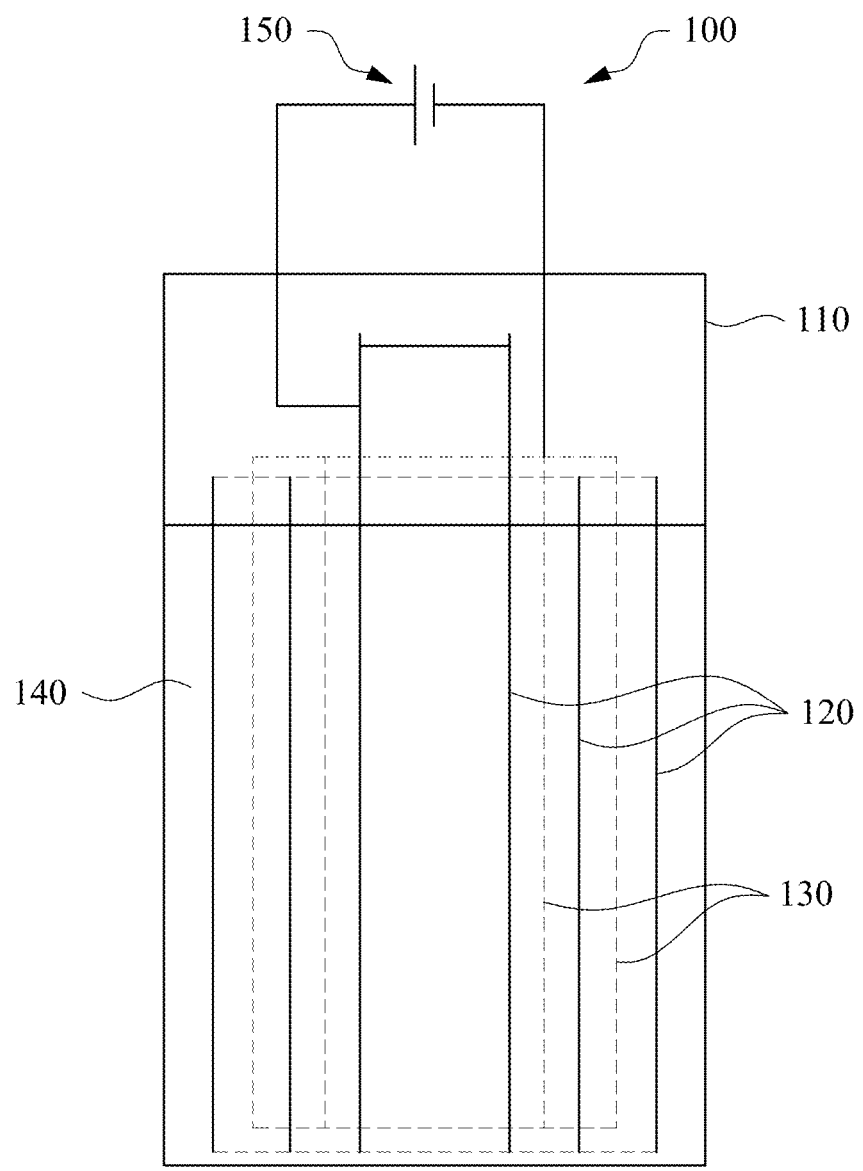
FIG. 1 is an electrolysis device in accordance with some embodiments of the present invention.

Please refer to FIG. 1. FIG. 1 is an electrolysis device in accordance with some embodiments of the present invention. An electrolysis device 100 includes a tank 110 and a least one anode 120, at least one cathode 130 as well as an electrolytic solution 140 that are disposed in the tank 110. These elements are described respectively in the following content.

Figure 2:
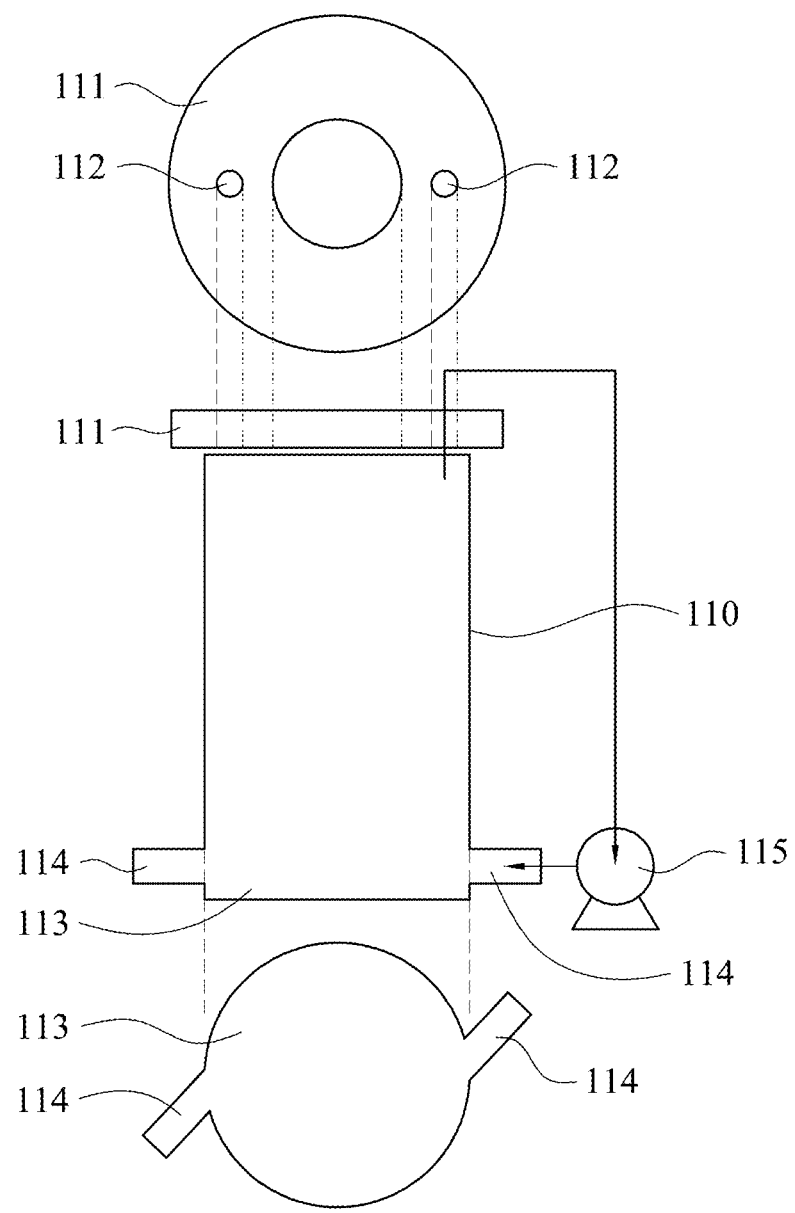
FIG. 2 is a cross sectional view and a corresponding top view of an electrolysis device.

Please refer to FIG. 2. FIG. 2 is a cross sectional view and a corresponding top view of an electrolysis device. In some embodiments, the tank 110 may be, for example, a hollow cylindrical glass tank. A lid 111 may be further disposed above the tank 110. As show in the top view of the lid 111 in FIG. 2, in some embodiments, one or more through holes 112 are arranged on the lid 111 and may be respectively used as a refluxing port and a sampling port. For example, the electrolytic solution 140 in the tank 110 may be sampled through the sampling port, or a pH meter may be disposed in the sampling port. In addition, one or more inlets 114 may be arranged on a bottom 113 of the tank 110. As shown in the top view of the bottom 113 in FIG. 2, two inlets 114 are arranged on the bottom 113, in which the two inlets 114 may be, for example, oppositely arranged. These inlets 114 may be communicated to the through holes 112 that are used as the refluxing ports, and a circulating pump 115 is used to pump the electrolytic solution 140 from an upper portion of the tank 110 to the inlets 114 on the bottom of the tank 110, so that the electrolytic solution 140 circulates in the electrolysis device 100 and is homogenized. The numbers of illustrative elements of the present invention are shown for clear understanding of the embodiments, and it is not intended to limit the scope of the present invention. The numbers of the through holes 112 and inlets 114 are adjustable according to requirements for performing the method of removing the ammonia nitrogen in the aqueous solution.

Figure 3:
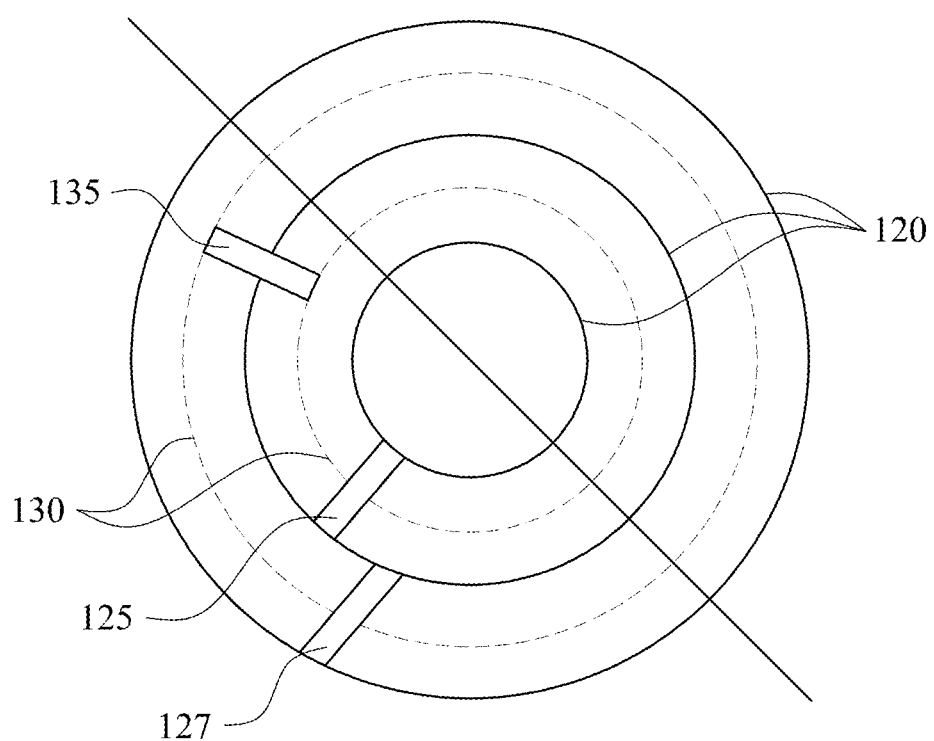
FIG. 3 is a top view of an anode and a cathode of an electrolysis device.

Please refer to FIG. 1 and FIG. 3. FIG. 3 is a top view of an anode and a cathode of an electrolysis device. An anode 120 and a cathode 130 are respectively a hollow cylindrical electrode, and the anode 120 and the cathode 130 are concentrically disposed. In some embodiments, as shown in FIG. 1 and FIG. 3, plural anodes 120 and plural cathodes 130 are concentrically and alternately disposed in the tank 110. In certain embodiments, a distance between two adjacent electrodes may be, for example, about 0.5 cm to about 2 cm. In other embodiments, an insulating film (not shown) may be disposed between the adjacent anode 120 and cathode 130, in order to avoid the anode 120 directly contacting the cathode 130. With the concentric arrangement of the electrodes, an effective area of the anode 120 and the cathode 130 increases, thereby increasing the oxidation rate of the ammonia nitrogen.

In some embodiments, several anodes 120 may be electrically communicated to one another, and several cathodes 130 may also be electrically communicated to one another, thereby respectively connecting to a cathode and an anode of a power supply 150, and performing the electrolytic reaction. The electrical communication may be, for example, disposing a conductive connector between two anodes 120 (or two cathodes 130). For example, the two anodes 120 are connected with one another by a conductive connector 125 or 127, or two cathodes 130 are connected with one another by a conductive connector 130, in which the connectors 125 and 127 do not contact the cathode 130, and the connector 135 does not contact the anode 120. In some other embodiments, one of the anodes 120 and one of the cathodes 130 may compose a pair of anode/cathode which is connected to one power supply 150. Therefore, the electrolysis device 100 can include several pairs of the anodes 120 and the cathodes 130.

Figure 4A:
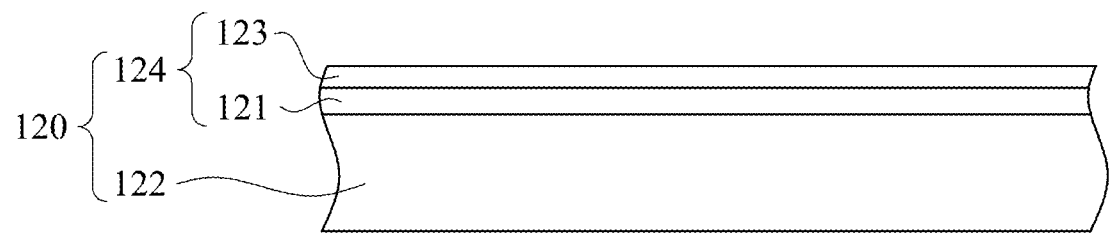
FIG. 4A is a cross-sectional view of a portion of an anode in accordance with one embodiment of the present invention.

In some embodiments, the anode 120 includes metal nickel (Nio), nickel hydroxide ($Ni(OH)_2$) or nickel oxyhydroxide (NiOOH). Please refer to FIG. 4A. FIG. 4A is a cross-sectional view of a portion of an anode in accordance with one embodiment of the present invention. The anode 120 includes a conductive substrate 122 and an electrode layer 124. The conductive substrate 122 may be, for example, a metal, conductive glass, graphite and the like, and the electrode layer 124 can include the metal nickel, the nickel hydroxide, the nickel oxyhydroxide or a combination thereof. In some embodiments, metal nickel foam having a greater surface area is used as the conductive substrate 122, so as to improve the efficiency of the conversion of the ammonia nitrogen using the electrolysis device. During the electrolytic reaction, the metal nickel foam may be oxidized to form a nanostructure having a material of $Ni(OH)_2$ 121/NiOOH 123, and the nanostructure is used as the electrode layer 124. In some other embodiments, typical deposition methods or coating methods may be applied to form the metal nickel, the nickel hydroxide or the nickel oxyhydroxide as the electrode layer 124 on the conductive substrate 122, so as to form the anode 120. When the metal nickel is used as the electrode layer 124, another conductive substrate (not shown) can be disposed beneath the metal nickel. During the electrolytic reaction, the metal nickel will react to form the nanostructure of $Ni(OH)_2$ 121/NiOOH 123. When the nickel hydroxide is used as the electrode layer 124, a surface of the nickel hydroxide will form nickel oxyhydroxide during the electrolytic reaction. And, when the nickel oxyhydroxide is used as the electrode layer 124, the ammonia nitrogen can be oxidized and converted into the nitrogen gas during the electrolytic reaction.

Figure 4B:
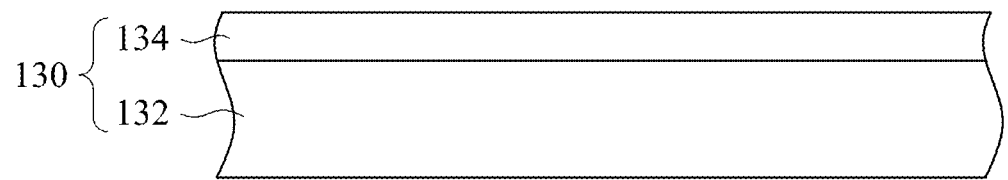
FIG. 4B is a cross-sectional view of a portion of a cathode in accordance with some embodiments of the present invention.

In some embodiments, the cathode 130 includes metal copper ($Cu^0$). Please refer to FIG. 4B. FIG. 4B is a cross-sectional view of a portion of a cathode in accordance with some embodiments of the present invention. For example, the cathode 130 includes a conductive substrate 132 and an electrode layer 130. The electrode layer 134 can include copper particles or a copper metal sheet. Preferably, the electrode layer 134 formed by the copper particles have a greater surface area, thereby improving the efficiency of the conversion of the ammonia nitrogen using the electrolysis device 100. In certain embodiments, an average diameter of a primary metallic crystal of the copper particles may be, for example, 20 nm to 40 μm. An average particle size of the copper particles may be 500 nm to 2 μm. When the copper particles have said dimensions, the oxidation rate of the ammonia nitrogen can be further improved, and the selectivity of converting the ammonia nitrogen into the nitrogen gas may increase. The conductive substrate 132 may be same as the conductive substrate 122 of the anode 120, for example, the conductive substrate 132 may be nickel. The copper particles may be formed on the conductive substrate 132 by any typical deposition methods or coating methods, so as to form the cathode 130. For example, the copper particles may be deposited by an electroless plating operation (chemical depositing operation) or an electroplating operation.

The anode 120 and the cathode 130 of the electrolysis device 100 of the present invention may be composed of different materials, and an electrolysis system having asymmetric electrodes is established. The reaction of converting the ammonia nitrogen into the nitrogen gas may take place in both the oxidizing side (the anode 120) and the reducing side (the cathode 130) of the electrolysis system having the asymmetric electrodes. Therefore, the selectivity of converting the ammonia nitrogen into the nitrogen gas may increase, and the nitrate remaining in the water may be reduced.

The electrolytic solution 140 of the electrolysis device 100 may include water and the ammonia nitrogen to be removed. The ammonia nitrogen dissolved in the water forms nitrogen-containing ions that enable the proceeding of the electrolytic reaction. Therefore, an additional electrolyte is not necessarily required in the electrolysis device 100. In certain examples, a concentration of the ammonia nitrogen in the electrolytic solution 140 is 20 ppm to 500 ppm before the electrolytic reaction takes place. When the concentration of the ammonia nitrogen is less than 20 ppm, the electrolytic reaction would not take place; however, when the electrolytic solution 140 has a high concentration (e.g., greater than 500 ppm) of the ammonia nitrogen, the cost increases, though the method of the present invention can be still applied.

In addition, in order to ensure the proceeding of the electrolytic reaction, the pH of the electrolytic solution 140 may be at least 9. Preferably, the pH of the electrolytic solution 140 may be 9 to 12. In other embodiments, the electrolytic solution 140 can further include a non-chloride electrolyte, for example, sulfate may be used. A concentration of the non-chloride electrolyte can be, for example, about 0.01 M to about 0.5 M. It is noted that the anode 120 and the cathode 130 used in the electrolysis device 100 include metal. If the electrolytic solution 140 includes chloride ions, the chlorides ions are likely to corrode the anode 120 and the cathode 130, leading to a reduced lifetime of the electrolysis device 100.

Figure 5:
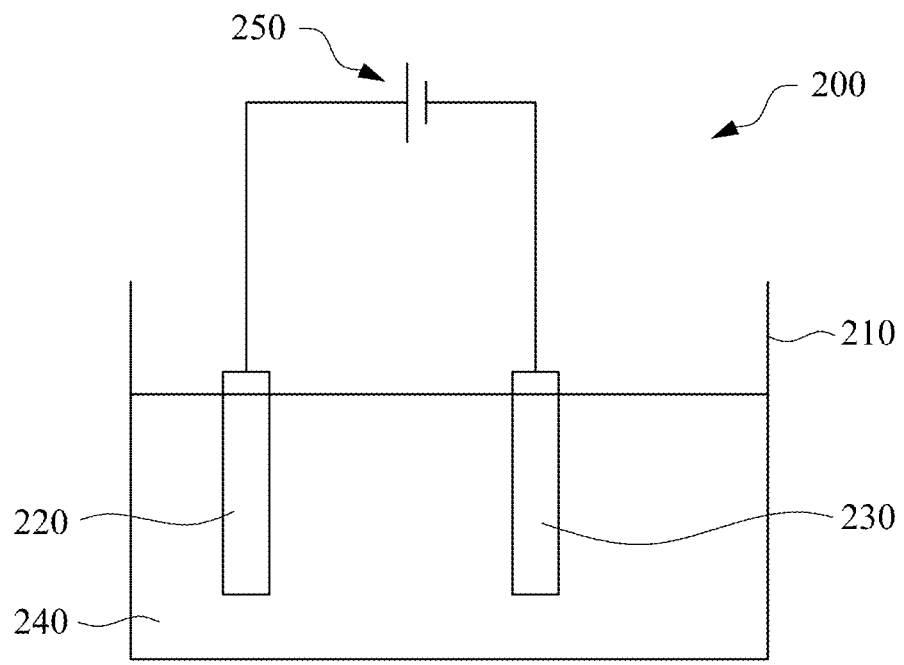
FIG. 5 is an electrolysis device in accordance with other embodiments of the present invention.

Next, please refer to FIG. 5. FIG. 5 is an electrolysis device in accordance with other embodiments of the present invention. In FIG. 5, elements that are similar to the elements of FIG. 1 are labelled with similar reference numbers. For example, a tank 210, an anode 220, a cathode 230, an electrolytic solution 240 and a power supply 250 in FIG. 5 can be respectively similar to or same as the tank 110, the anode 120, the cathode 130, the electrolytic solution 140 and the power supply 150 in FIG. 1. An electrolysis device 200 is also an electrolysis device having two electrodes, which is suitable to be used in a large-scale treatment of the ammonia nitrogen in the water. What is different is that the anode 220 and the cathode 230 of the electrolysis device 200 may be respectively a sheet electrode, and the anode 220 and the cathode 230 are respectively disposed on two opposing sides of the tank 210.

Figure 6:
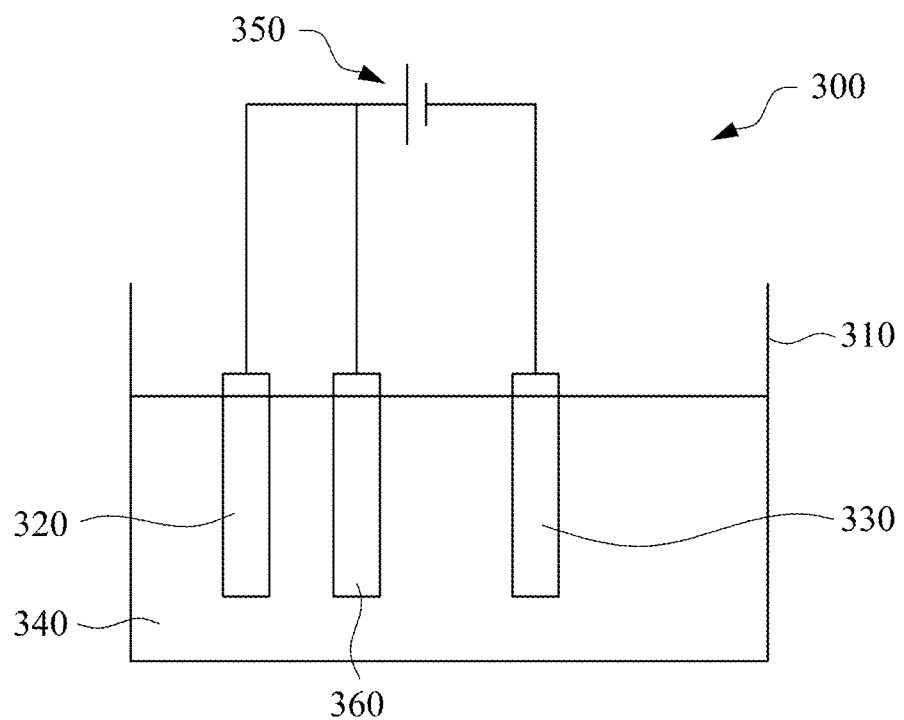
FIG. 6 is an electrolysis device in accordance with another embodiment of the present invention.

Please refer to FIG. 6. FIG. 6 is an electrolysis device in accordance with another embodiment of the present invention. In FIG. 6, elements that are similar to the elements of FIG. 5 are labelled with similar reference numbers. For example, a tank 310, an anode 320, a cathode 330, an electrolytic solution 340 and a power supply 350 in FIG. 6 can be respectively similar to or same as the tank 210, the anode 220, the cathode 230, the electrolytic solution 240 and the power supply 250 in FIG. 5. What is different is that a reference electrode 360 is additionally configured in an electrolysis device 300, and the electrolysis device 300 is configured to be an electrolysis device having three electrodes. The reference electrode 360 can be, for example, a saturated calomel electrode.

A method of removing the ammonia nitrogen in the water is described with reference to the electrolysis device 100 of FIG. 1. In some embodiments, the electrolysis device 100 is provided first, and the electrolytic solution 140 including the ammonia nitrogen to be removed is accommodated in the electrolysis device 100. Next, a proper current density is applied to the anode 120 and the cathode 130 using the power supply 150, so as to perform the electrolytic reaction.

The current density of the present invention may be regarded as the current density of the anode.

In some embodiments, the current density of the anode can be, for example, 0.08 mA/cm² to 2.5 mA/cm². When the current density smaller than 0.08 mA/cm² is applied, an effect of the electrolytic reaction is not significant. In contrast, when the current density greater than 2.5 mA/cm² is applied, the electrodes may be damaged.

In some embodiments, when the metal nickel is used as the anode 120, the electrolytic reaction may include forming the nickel oxyhydroxide on a surface of the metal nickel or a surface of the nickel hydroxide, in which the nickel oxyhydroxide protects the metal nickel, and metal dissolution occurring during the electrolytic reaction may be avoided. In addition, the nickel oxyhydroxide may mediate electron transfer after the ammonia nitrogen is oxidized, so that the nitrate and the nitrogen gas can be formed.

Specifically, reactions shown in Formula (1) to Formula (3) may take place at the anode 120 during the electrolytic reaction, thereby converting the ammonia nitrogen into the nitrogen gas.

$$Ni^{III}O\text{-}OH+NH_3 \rightarrow Ni^{II}O\text{-}NH_2+H_2O \tag{1}$$

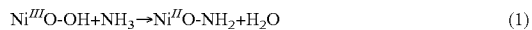

$$2Ni^{II}O\text{—}NH_2 \rightarrow 2Ni^{II}O\text{—}N_2H_4 \tag{2}$$

$$2Ni^{II}O\text{—}N_2H_4+6OH^- \rightarrow 2Ni^{III}O\text{-}OH+N_2\uparrow+4H_2O+6e^- \tag{3}$$

Or, after the ammonia nitrogen (NH₃) forms NH₂, NH₂ may be further oxidized to N₂, NO₂⁻ or NO₃⁻ by the oxidizing reaction occurring at the anode 120.

On the other hand, reactions shown in Formula (4) to Formula (6) may take place at the cathode 130 during the electrolytic reaction, thereby reducing NO₃⁻ to NO₂⁻, N₂ or NH₃.

$$NO_3^- + H_2O + 2e^- \rightarrow NO_2^- + 2OH^- \tag{4}$$

$$2NO_2^- + 4H_2O + 6e^- \rightarrow N_2 + 8OH^- \tag{5}$$

$$NO_2^- + 5H_2O + 6e^- \rightarrow NH_3 + 7OH^- \tag{6}$$

The nitrogen gas formed at the anode 120 and the cathode 130 will naturally release from the electrolytic solution, and said oxidizing reaction as well as said reducing reaction are continually performed on the NH₃ generated at the cathode 130 until the NH₃ is converted to the nitrogen gas that can release from the electrolytic solution. In other words, the copper used in the cathode 130 is capable of reducing the nitrate derived from the anode 120, and the combination of the anode 120 and the cathode 130 can effectively increase the selectivity of converting the ammonia nitrogen into the nitrogen gas.

Example 1

The removal of the ammonia nitrogen in Example 1 was performed by the electrolysis device 100, in which both lengths of the anode 120 and the cathode 130 were 16.5 cm, diameters of the three hollow cylindrical anodes 120 were respectively 3 cm, 5 cm and 7.5 cm, and diameters of the two hollow cylindrical cathodes 130 were respectively 4 cm and 6.5 cm. The anodes 120 as well as the cathodes 130 were concentrically and alternately disposed in the tank 110, which had a height of 20 cm and a diameter of 8.5 cm for treating 1 liter solution in a batch process. The anodes 120 were made from the metal nickel foam and had an effective area of 1000 cm², and the cathodes 130 were a plated copper particles layer that was chemically deposited on the nickel substrate by using a chemical reduction method, in which the average particle size of the copper particles was 20 μm. The electrolytic solution at pH 11 contained 100 ppm ammonia nitrogen (ammonia sulfate) and 0.01 M sodium sulfate as electrolytes. Next, current densities of 0.65 mA/cm² (□), 1 mA/cm² (○), 1.5 mA/cm² (∇), 2 mA/cm² (◆) and 2.5 mA/cm² (X) were respectively applied to the anodes 120 and the cathodes 130 of the electrolysis device 100, thereby performing the electrolytic reaction for 7 hours. The removal rate of the ammonia nitrogen and changes in respective concentrations of the nitrite, the nitrate and the nitrogen gas based on different current densities within different electrolysis time were recorded, and the results were shown in FIG. 8A through FIG. 8E.

Comparative Example 1

Comparative Example 1 was performed by the same method as Example 1. However, both anodes and cathodes of the electrolysis device used in Comparative Example 1 were the anodes 120 of the electrolysis devices 100, and the current densities applied in Comparative Example 1 were respectively 0.08 mA/cm² (○), 0.15 mA/cm² (∇), 0.3 mA/cm² (◆), 0.6 mA/cm² (□) and 1 mA/cm² (X). That is, the anodes and the cathodes of Comparative Example 1 were both composed of metal nickel foam, and a symmetric electrode system was established in Comparative Example 1. The results of Comparative Example 1 were shown in FIG. 9A through FIG. 9E.

Figure 7A:
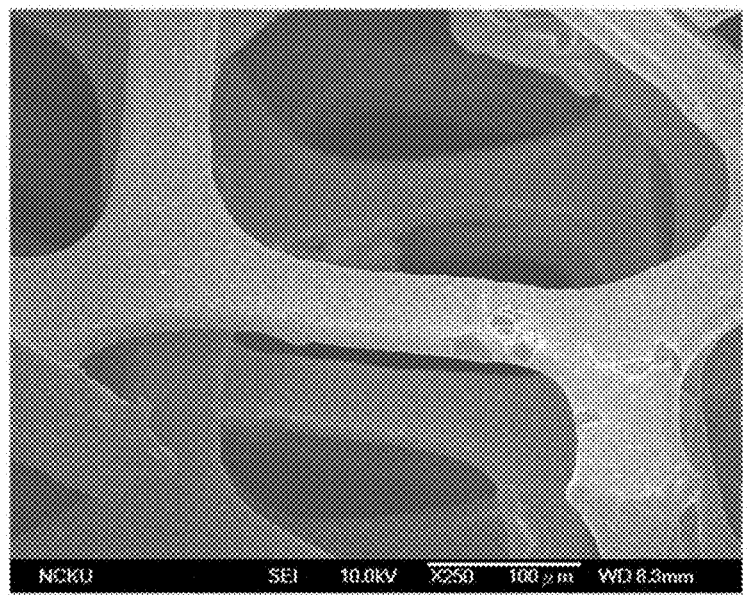
FIG. 7A is an electron microscope image of metal nickel foam of Example 1.
Figure 7B:
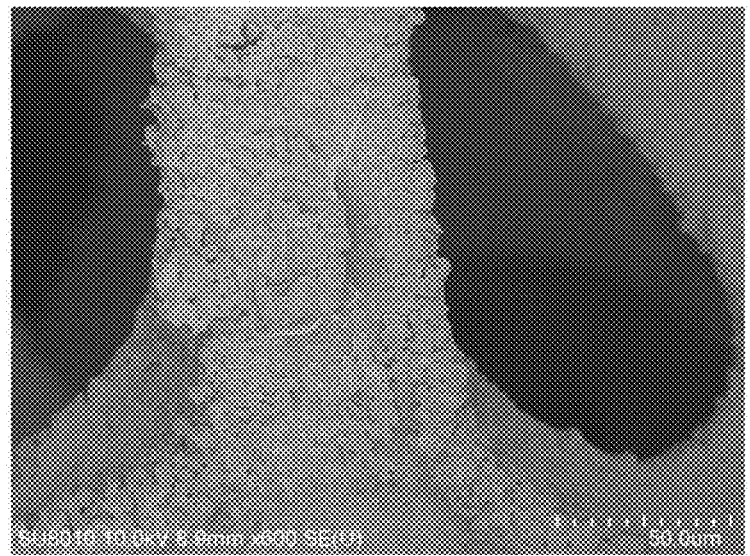
FIG. 7B is an electron microscope image of a cathode of metal nickel foam with copper particles formed on a surface thereof.
Figure 7C:
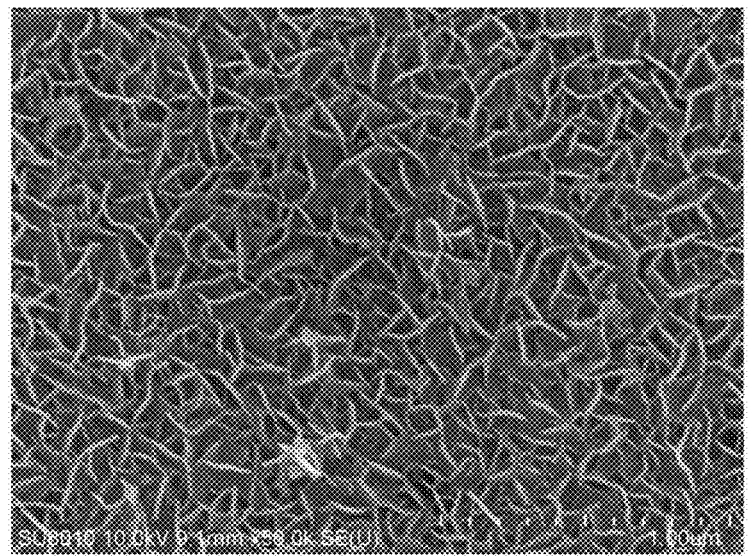
FIG. 7C is an electron microscope image of an anode of a metal nickel foam that a layer of nickel oxyhydroxide is formed on a surface thereof during an electrolytic reaction.
Figure 7D:
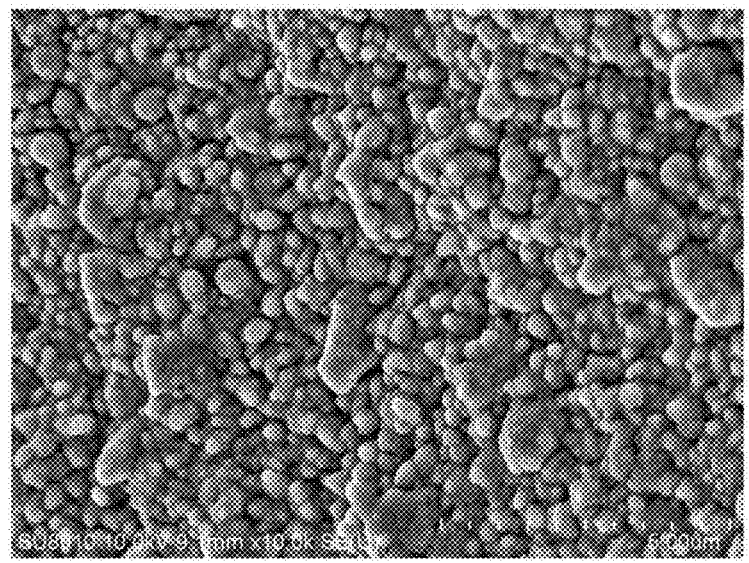
FIG. 7D is an enlarged electron microscope image of copper particles.
Figure 7E:
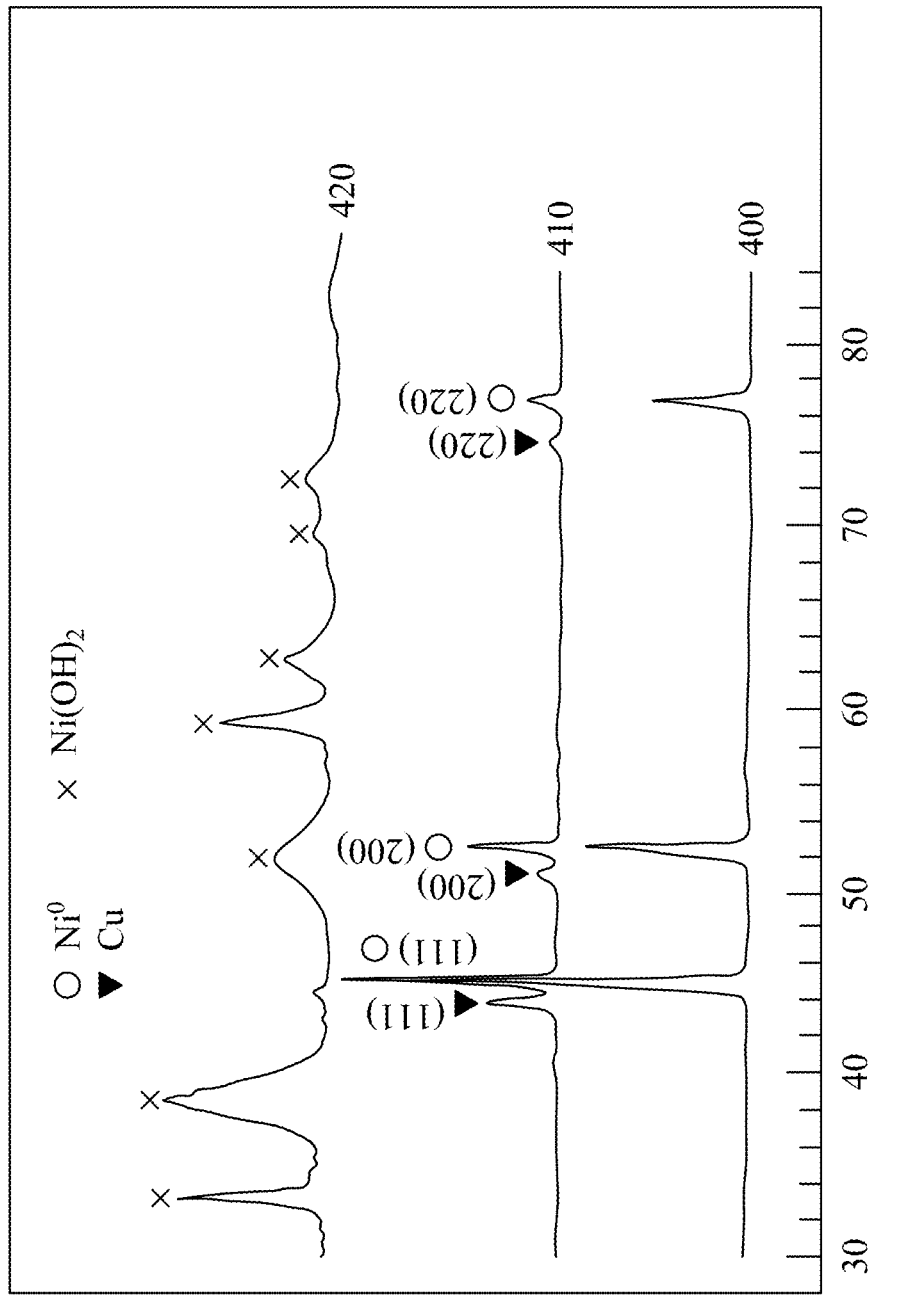
FIG. 7E is X-ray Diffraction (XRD) analysis of an anode and a cathode of Example before/after an electrolytic reaction.

First, please refer to FIG. 7A through FIG. 7E. FIG. 7A is an electron microscope image of metal nickel foam of Example 1. FIG. 7B is an electron microscope image of a cathode of metal nickel foam with copper particles formed on a surface thereof. FIG. 7C is an electron microscope image of an anode of a metal nickel foam that a layer of nickel oxyhydroxide is formed on a surface thereof during an electrolytic reaction, in which the nickel oxyhydroxide exists in a nanosheet form. FIG. 7D is an enlarged electron microscope image of copper particles. And, FIG. 7E is X-ray Diffraction (XRD) analysis of an anode and a cathode of Example before/after an electrolytic reaction, in which 400 represents metal nickel foam, 410 represents metal nickel foam and copper of a cathode and 420 represents an anode during the electrolytic reaction. According to FIG. 7A through FIG. 7E, the metal nickel foam of the anode forms nickel hydroxide, and the nickel hydroxide will further be oxidized to nickel oxyhydroxide for oxidation of the ammonia nitrogen.

Figure 8A:
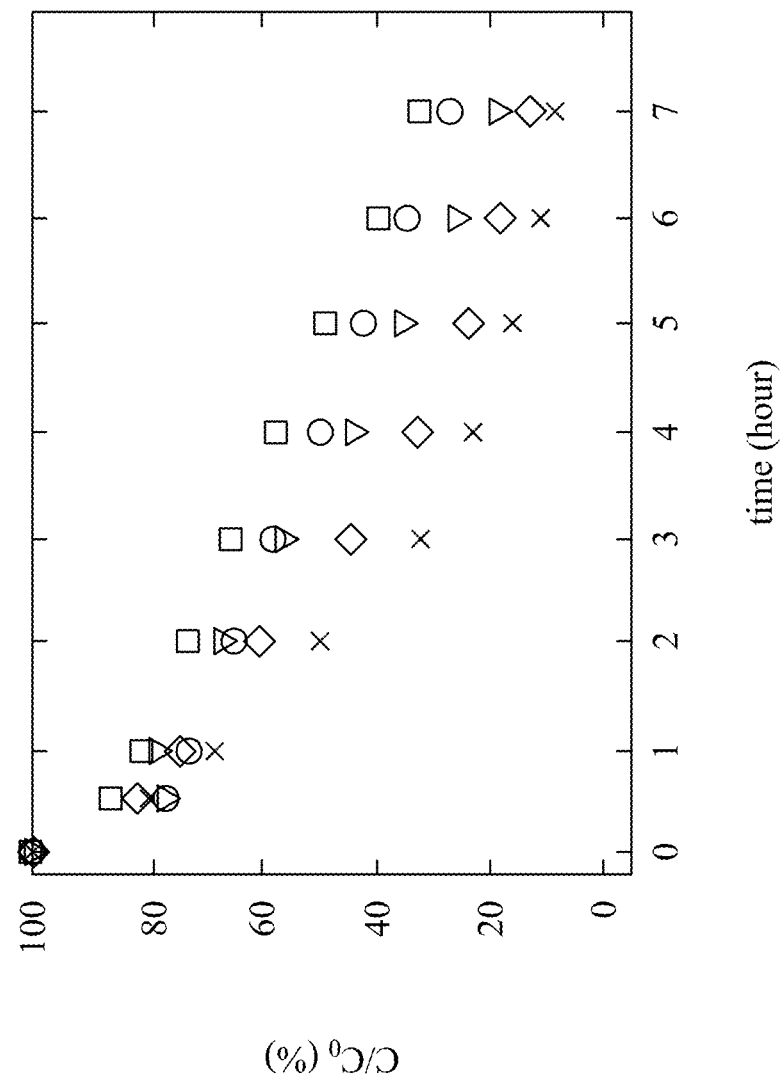
FIG. 8A and FIG. 9A are charts respectively showing an oxidation rate of ammonia nitrogen in Example 1 and Comparative Example 1.
Figure 8B:
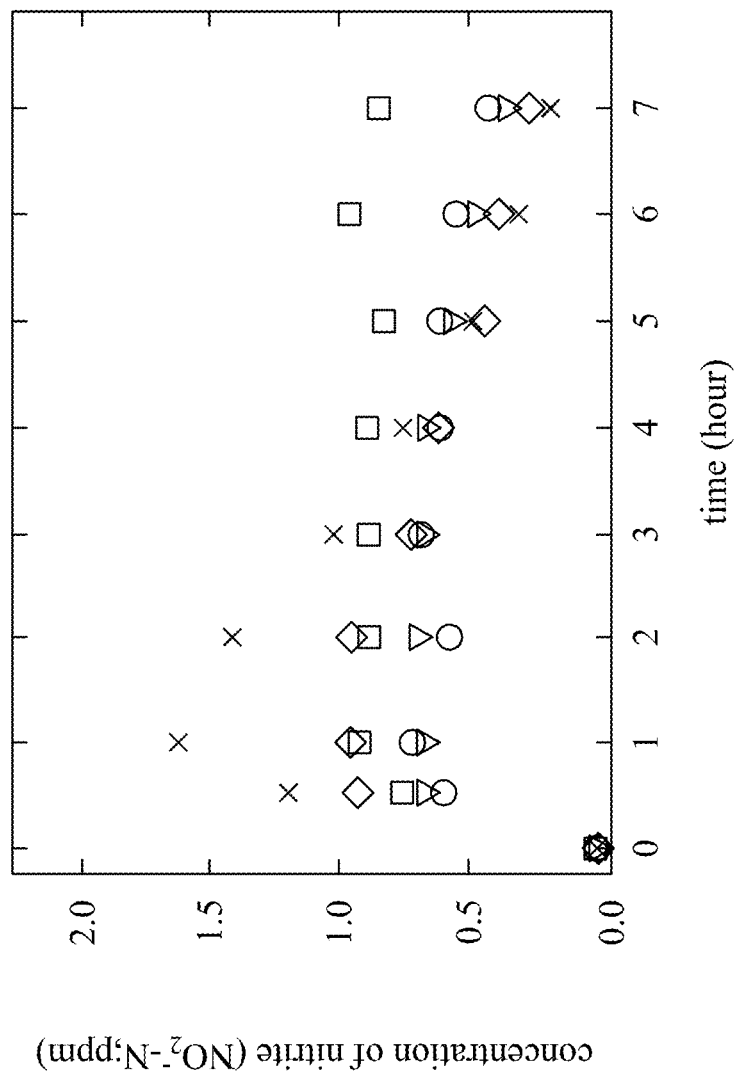
FIG. 8B and FIG. 9B are charts respectively showing a change in a concentration of nitrite in Example 1 and Comparative Example 1.
Figure 8C:
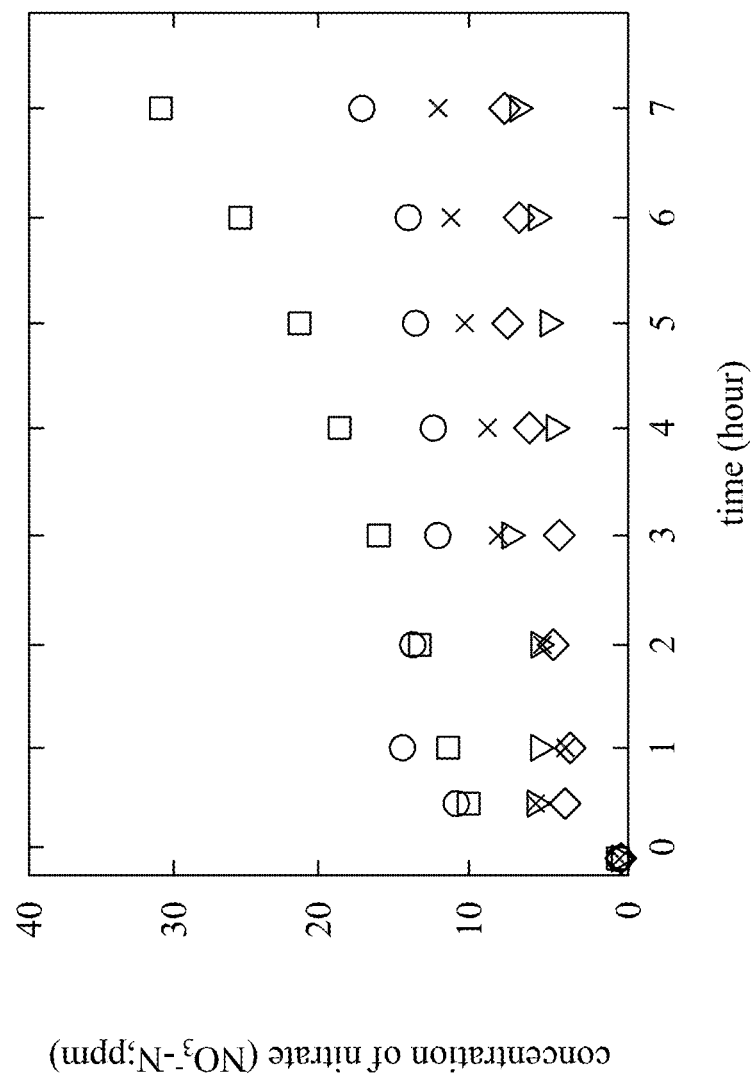
FIG. 8C and FIG. 9C are charts respectively showing a change in a concentration of nitrate in Example 1 and Comparative Example 1.
Figure 8D:
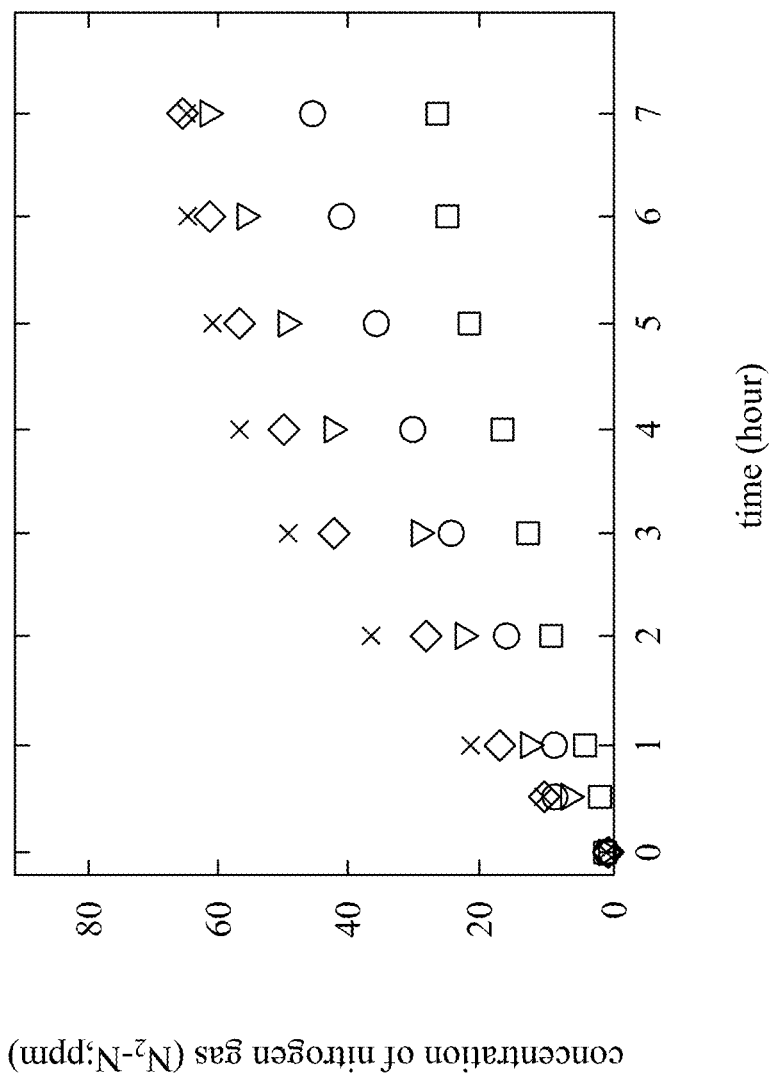
FIG. 8D and FIG. 9D are charts respectively showing a change in a concentration of nitrogen gas in Example 1 and Comparative Example 1.

Next, as shown in FIG. 8A, the electrolysis device 100 and the method of the present invention are applied, and the ammonia nitrogen can be effectively oxidized (or removed) by the electrolytic reaction, particularly when the time for the electrolytic reaction increases. The ammonia nitrogen may be further converted into the nitrite, the nitrate or the nitrogen gas, so that the ammonia nitrogen in the water will decrease as the time of the electrolytic increases. Moreover, a high current density is used to further improve the oxidation rate of the ammonia nitrogen. In Example 1, the oxidation rate of the ammonia nitrogen may be greater than 80% after 7 hours of the electrolytic reaction is performed. Furthermore, as shown in FIG. 8B through FIG. 8D, during the electrolytic reaction, the concentration of the nitrite in the water does not change significantly; however, the concentrations of the nitrate and the nitrogen gas increase as the time passes. Particularly, the concentration of the nitrogen gas is greater than the concentration of the nitrate.

Figure 8E:
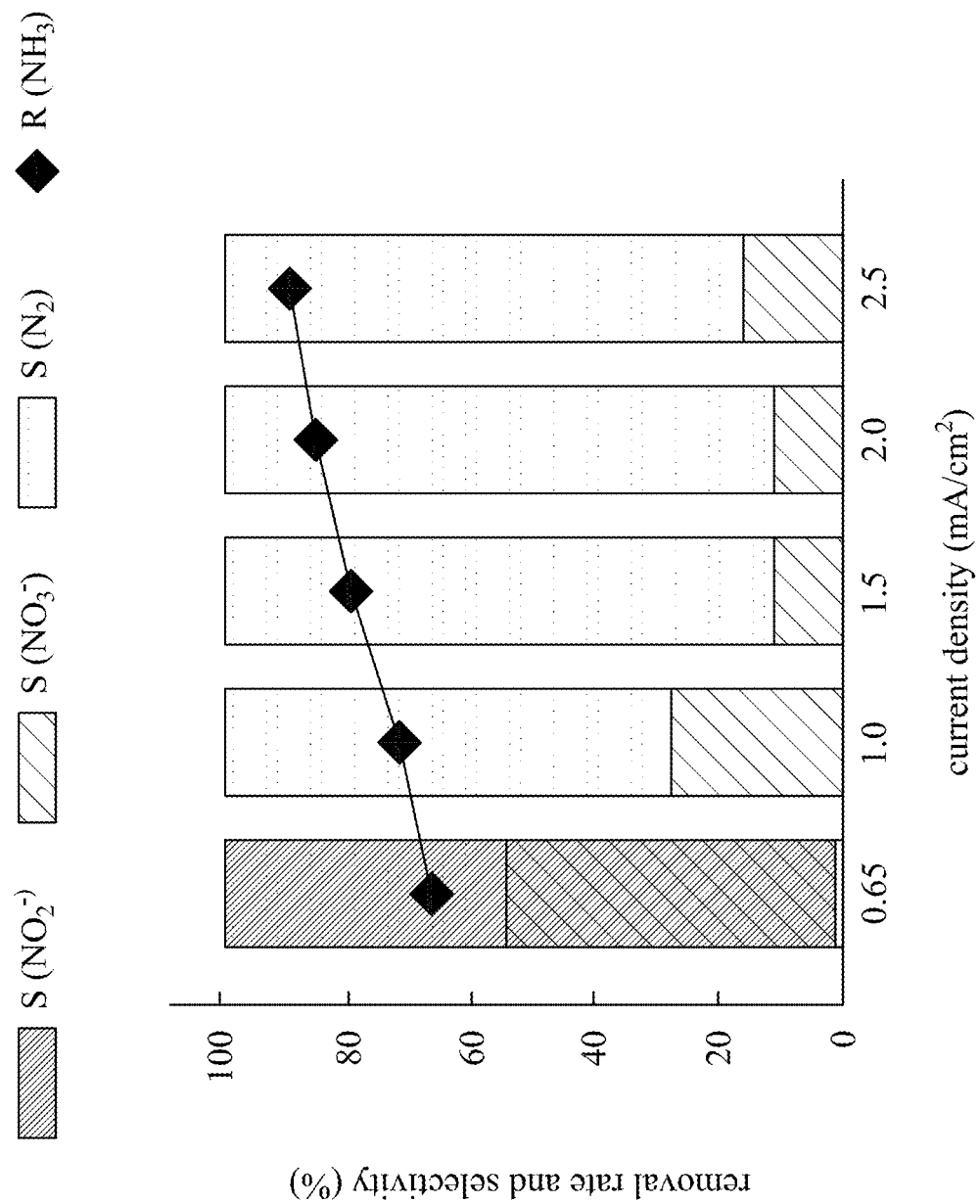
FIG. 8E and FIG. 9E are a line chart and a bar chart respectively showing a removal rate and a conversion selectivity of ammonia nitrogen in Example 1 and Comparative Example 1.

Please refer to FIG. 8E. The selectivity of converting the ammonia nitrogen into the nitrite, the nitrate and the nitrogen and the removal rate of the ammonia nitrogen are shown. The calculation of the selectivity is described as follows:

First, a removal amount ($\Delta C$) of the ammonia nitrogen is calculated by an initial concentration ($C_0$) and a treated concentration (C) of the ammonia nitrogen, as shown in Formula (7). Then, the concentration of the nitrate ($C(NO_3^-)$), the concentration of the nitrite ($C(NO_2^-)$) or the concentration of the nitrogen gas ($C(N_2)$) is divided by the removal amount ($\Delta C$) and multiplies 100%, as shown in Formula (8-1) through Formula (8-3), thereby obtaining the respective selectivity (S).

$$C_0 - C = \Delta C \quad (7)$$

$$S(NO_3^-) = C(NO_3^-)/\Delta C \times 100\% \quad (8\text{-}1)$$

$$S(NO_2^-) = C(NO_2^-)/\Delta C \times 100\% \quad (8\text{-}2)$$

$$S(N_2) = C(N_2)/\Delta C \times 100\% \quad (8\text{-}3)$$

As shown in FIG. 8E, the high selectivity of converting the ammonia nitrogen into the nitrogen gas is realized by the electrolysis device 100 and the method of the present invention, so that most of the ammonia nitrogen can be converted into the nitrogen gas, and the nitrate as well as the nitrite remaining in the water may be reduced. In addition, the selectivity of converting the ammonia nitrogen into to the nitrogen gas may be further improved by increasing the current density.

Figure 9A:
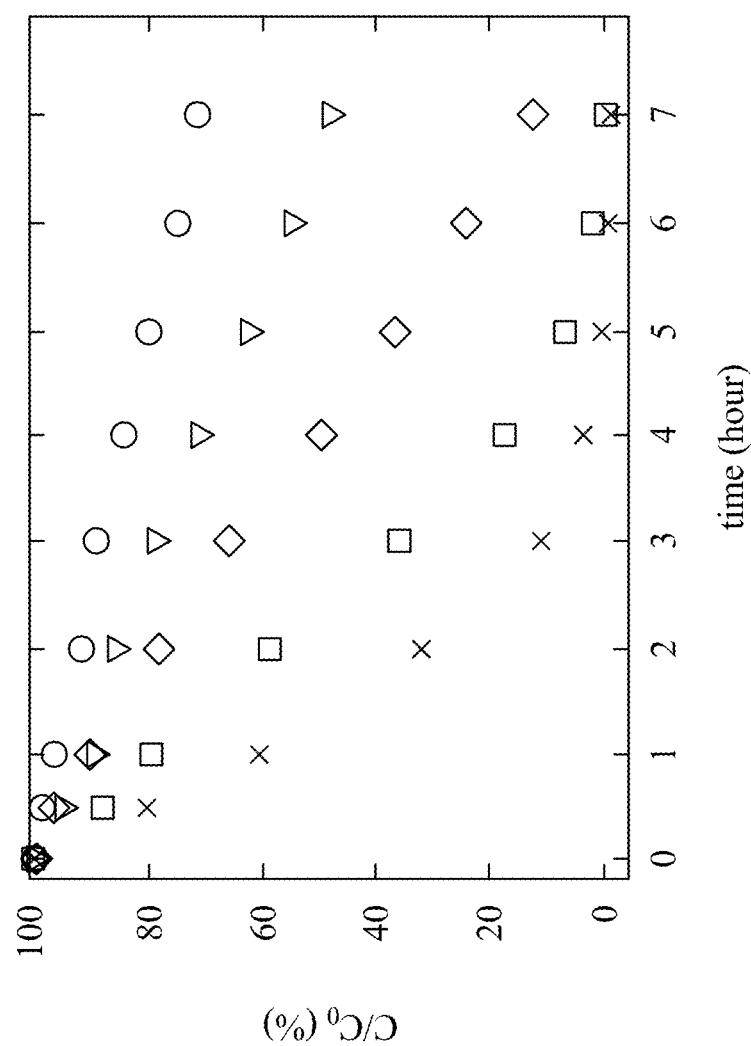
Figure 9B:
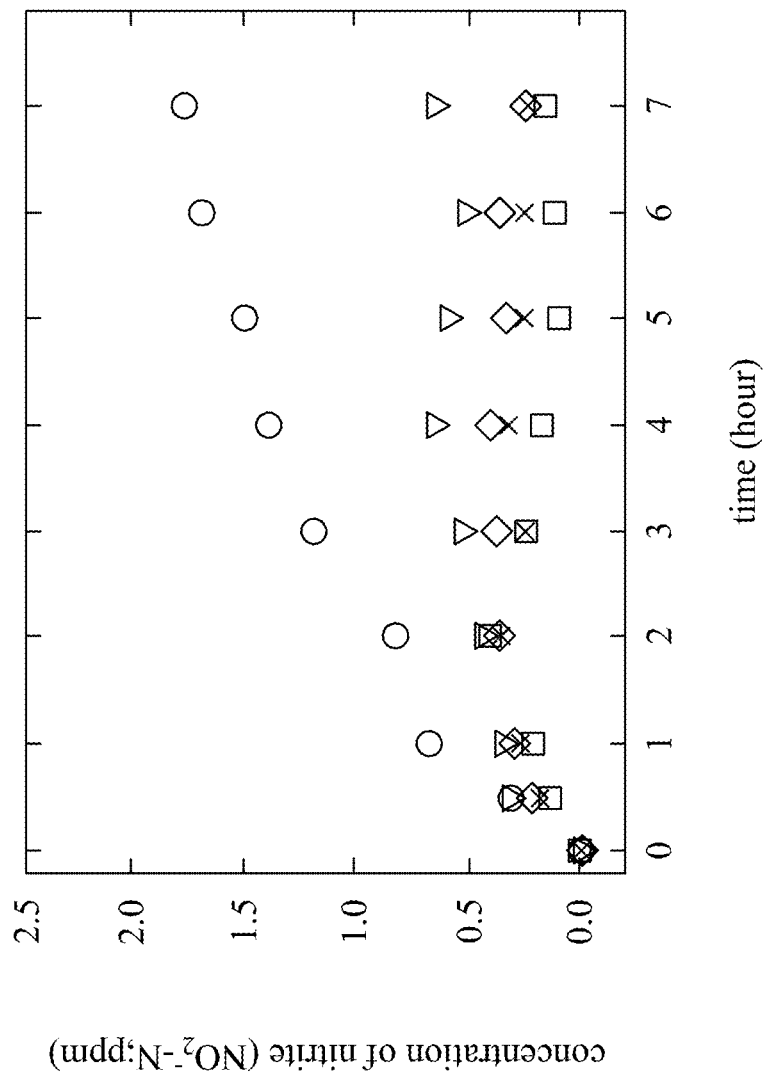
Figure 9C:
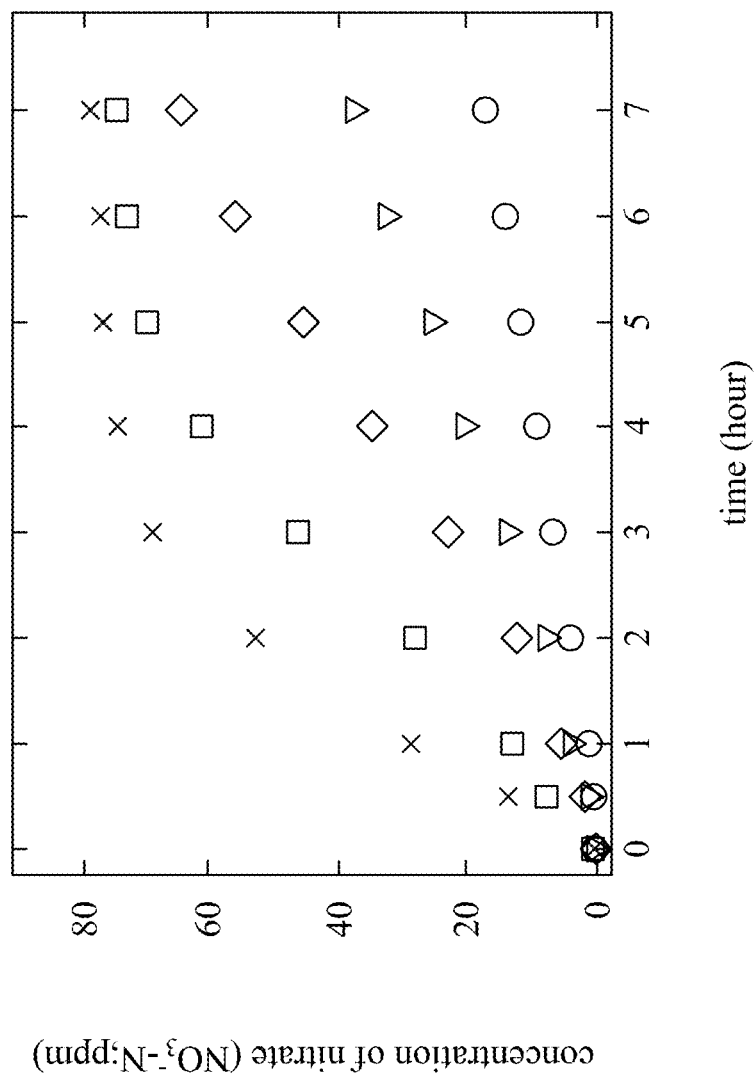
Figure 9D:
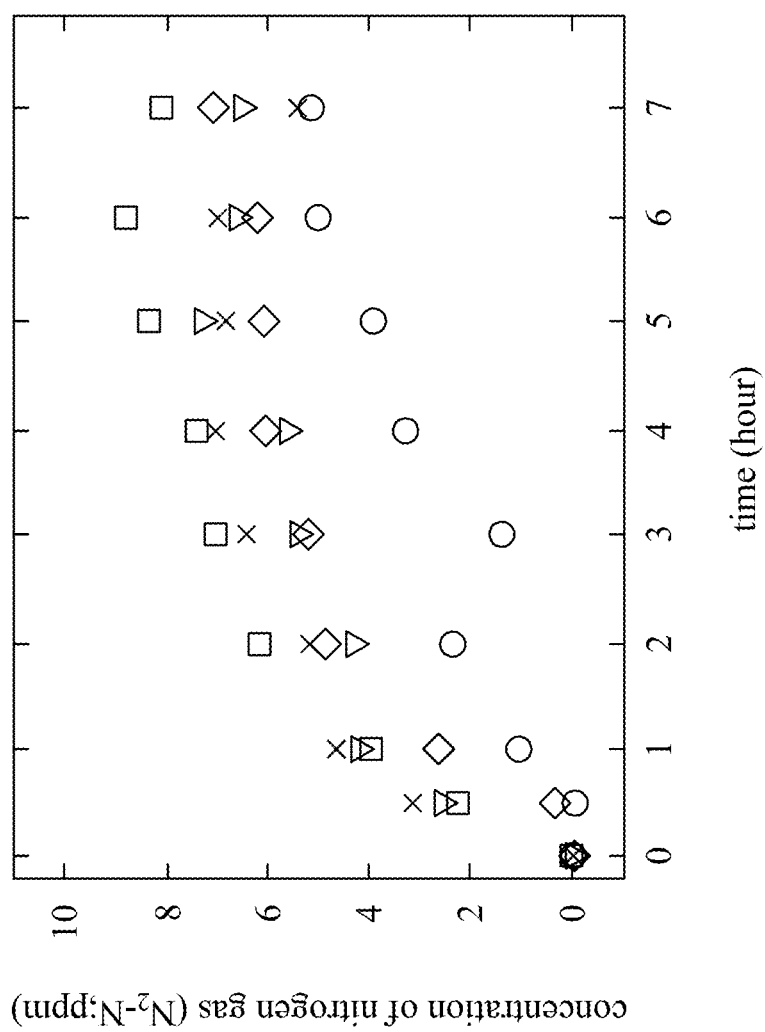
Figure 9E:
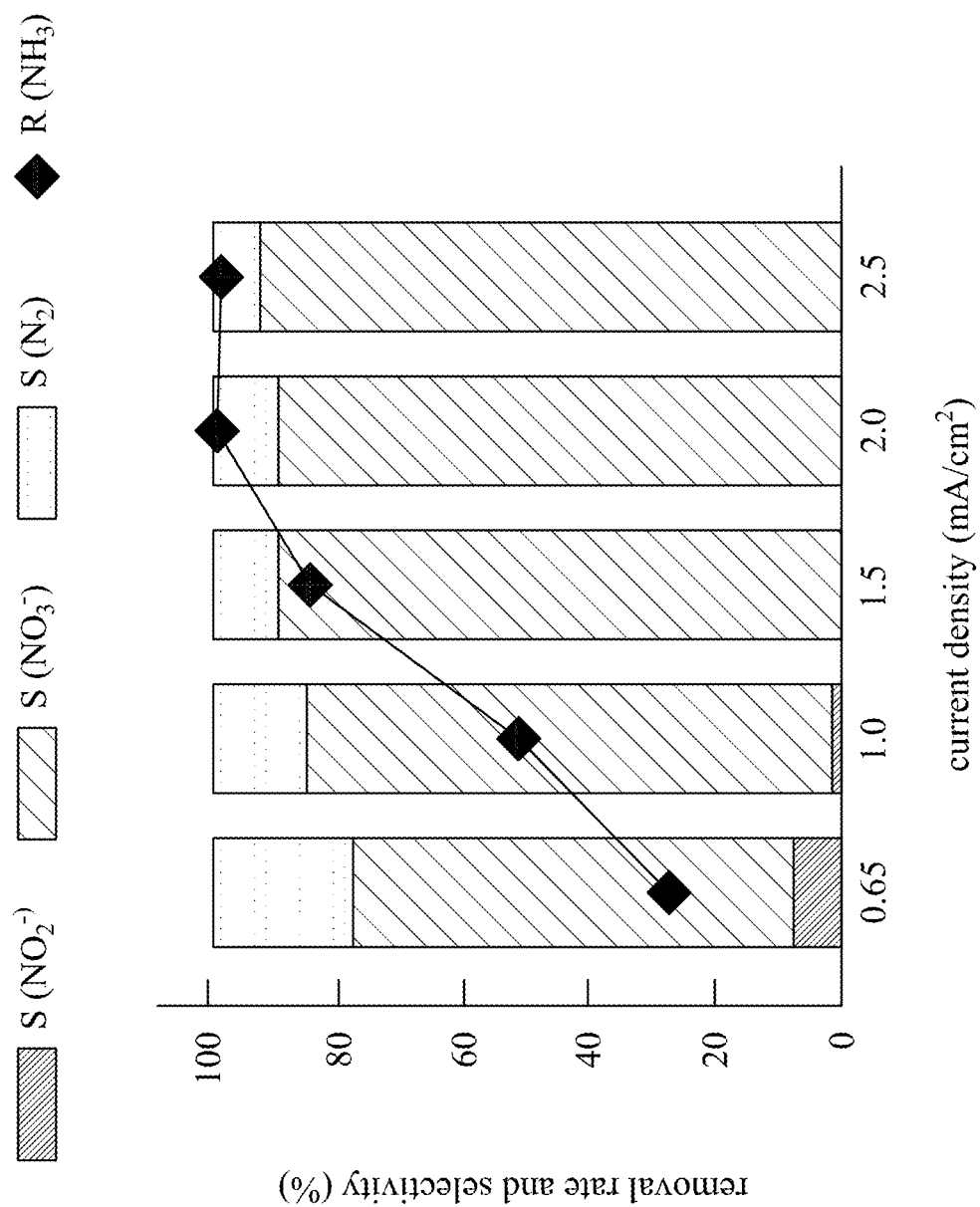

On the other hand, as shown in FIG. 9A, when the electrolysis device having the metal nickel foam as the anodes and the cathodes, the oxidation rate of the ammonia nitrogen using the lower current density is not satisfactory. Besides, as shown in FIG. 9B through FIG. 9E, the ammonia nitrogen in Comparative Example 1 is majorly converted into the nitrate. As shown in FIG. 9E, the rate of converting the ammonia nitrogen into the nitrogen gas cannot increase, though the removal rate of the ammonia nitrogen increases because of the increase in the current density. In the electrolytic reaction of Comparative Example 1, merely a slight amount of the nitrogen gas is formed. This is resulted from using the metal nickel foam as the cathode that is relatively inert to the nitrate in the water, such that the nitrate cannot be reduced to the nitrogen gas. Apparently, the selectivity of converting the ammonia nitrogen into the nitrogen gas cannot be improved without the anodes and the cathodes composed of particular materials.

Example 2

The removal of the ammonia nitrogen in Example 2 was performed on the electrolytic solutions respectively having concentrations of the ammonia nitrogen of 50 ppm, 100 ppm, 200 ppm and 500 ppm by the electrolysis device 100, in which 0.01 M sodium sulfate was additionally added as the electrolyte. The electrolytic reaction was performed by applying 1.5 mA/cm2 current density to the anodes 120 and the cathodes 130 of the electrolysis device 100 for 7 hours. The removal rate of the ammonia nitrogen and changes in respective concentrations of the nitrite, the nitrate and the ammonia nitrogen based on different current densities within different electrolysis time were recorded, and the results were shown in FIG. 10A.

Comparative Example 2

Comparative Example 2 was performed by the same method as Example 2. However, both anodes and cathodes of the electrolysis device used in Comparative Example 2 were the anodes 120 of the electrolysis devices 100. Because only the anodes of Comparative Example 2 had functions, the current density applied in Comparative Example 2 was 0.5 mA/cm$^2$. The results of Comparative Example 2 were shown in FIG. 10B.

Figure 10A:
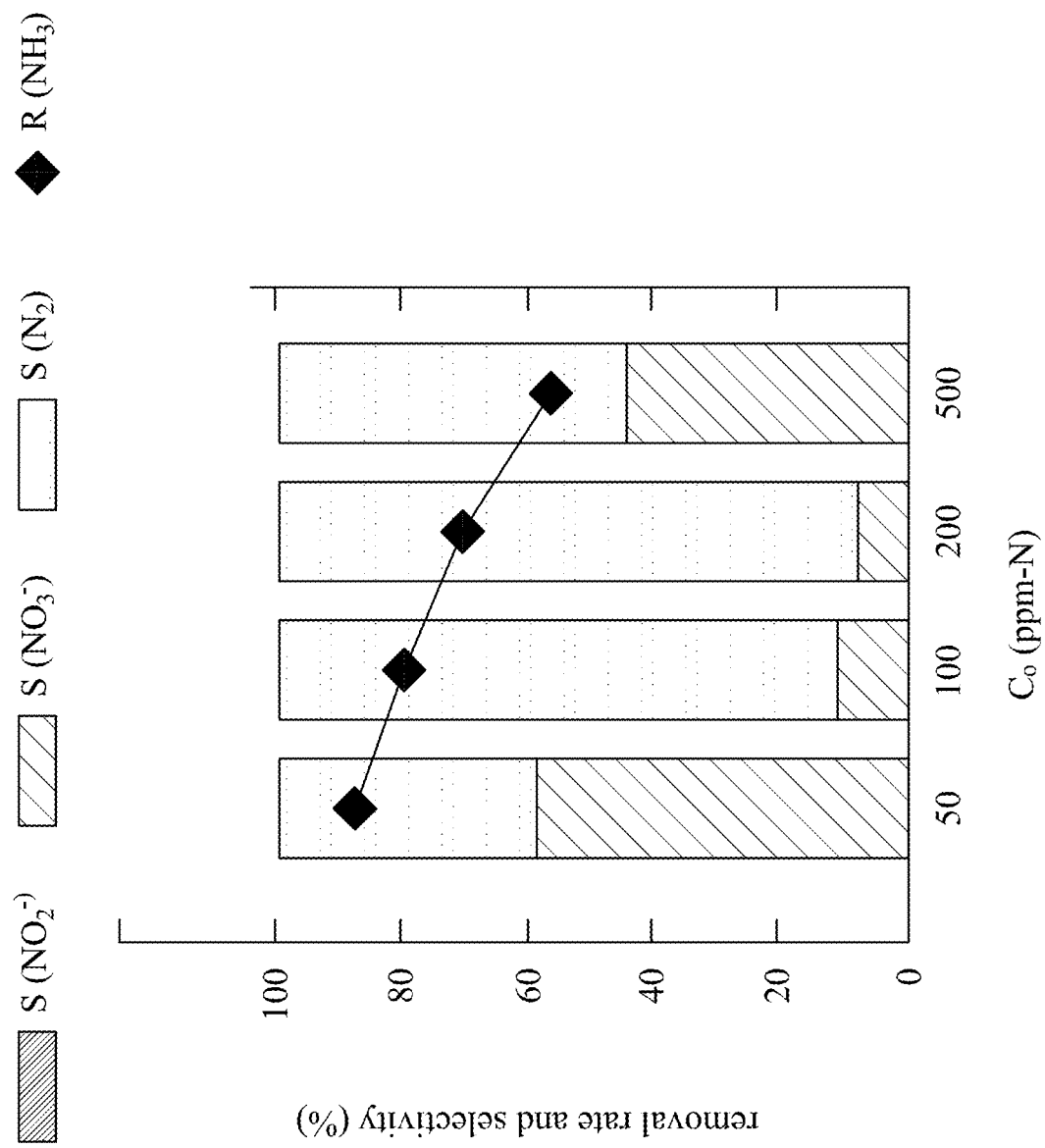
FIG. 10A and FIG. 10B are a bar chart and a line chart respectively showing a removal rate and a conversion selectivity of ammonia nitrogen in Example 2 and Comparative Example 2.

Please refer to FIG. 10A. FIG. 10A shows a bar chart and a line chart of a removal rate and a conversion selectivity of ammonia nitrogen in Example 2. According to the results shown in the charts, the high selectivity of converting the ammonia nitrogen into the nitrogen gas is realized, and the nitrate remaining in the water is reduced. Particularly, when the current density of 2 mA/cm$^2$ is used, the oxidation rate of the ammonia nitrogen greater than 90%, the conversion rate of the nitrate about 10% and the conversion rate of the nitrogen gas about 90% may be achieved. And the conversion rate of the nitrite is less than 1%.

Figure 10B:
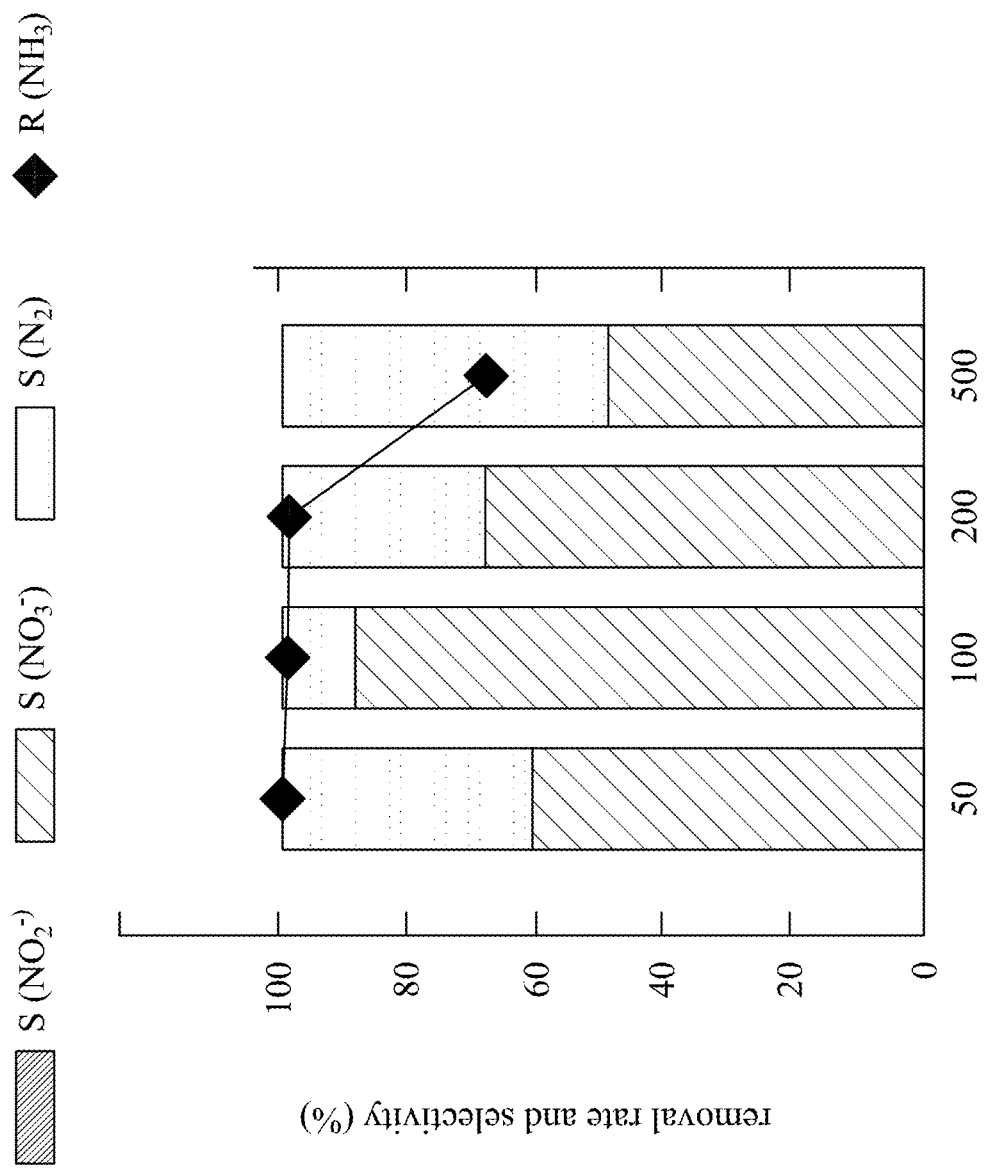

Next, please refer to FIG. 10B. FIG. 10B shows a bar chart and a line chart of a removal rate and a conversion selectivity of ammonia nitrogen in Comparative Example 2. When the anodes and the cathodes composed of particular materials are not used, the conversion rate of the nitrogen gas is merely 10%, though the oxidation rate of the ammonia nitrogen is achieved. The conversion rate of the nitrate reaches 90% in Comparative Example 2, which represents that most of the ammonia nitrogen is converted into the nitrate. And the conversion rate of the nitrite is less than 1%. Apparently, the concentration of the nitrate remaining in the water is still too high in Comparative Example 2.

The ammonia nitrogen in the water can be converted into the nitrogen gas, and the nitrate in the water can be reduced by using the method of removing the ammonia nitrogen in the aqueous solution of the present invention, in which the anodes and the cathodes composed of particular materials are used.

Although the present invention has been described in considerable detail with reference to certain embodiments thereof, while it is not intended to limit the present invention. It will be apparent to those skilled in the art that various modifications and variations can be made to the structure of the present invention without departing from the scope or spirit of the invention. Therefore, the spirit and scope of the appended claims should not be limited to the description of the embodiments contained herein.

What is claimed is:

1. A method of removing ammonia nitrogen in an aqueous solution, the method comprising:
   providing an electrolysis device, the electrolysis device comprising:
   at least one anode, comprising nickel hydroxide (Ni(OH)$_2$) or nickel oxyhydroxide (NiOOH);
   at least one cathode, comprising metal copper; and
   an electrolytic solution, comprising ammonia nitrogen, wherein pH of the electrolytic solution is 9 to 12, and the electrolytic solution excludes chloride ions; and
   a tank accommodating the at least one anode, the at least one cathode and the electrolytic solution; and
   performing an electrolytic reaction, wherein the electrolytic reaction is performed under a current density of 0.08 mA/cm$^2$ to 2.5 mA/cm$^2$, and the nickel hydroxide in the at least one anode is reacted to form nickel oxyhydroxide during the electrolytic reaction, such that the ammonia nitrogen is converted into nitrogen gas, nitrate or nitrite by the nickel oxyhydroxide during the electrolytic reaction.

2. The method of claim 1, wherein a concentration of the ammonia nitrogen in the electrolytic solution is 20 ppm to 500 ppm before the electrolytic reaction is performed.

3. The method of claim 1, wherein the at least one anode and the at least one cathode are respectively a hollow cylindrical electrode, and the at least one anode and the at least one cathode are concentrically disposed.

4. The method of claim 1, wherein the electrolysis device comprises a plurality of anodes and a plurality of cathodes, each of the anodes and the cathodes is a hollow cylindrical electrode, and the anodes and the cathodes are concentrically and alternately disposed.

5. The method of claim 1, wherein the metal copper is copper particles.

* * * * *